(12) United States Patent
Jo (10) Patent No.: US 9,706,256 B2
(45) Date of Patent: Jul. 11, 2017

(54) SYSTEM AND METHOD FOR MAKING SEMANTIC ANNOTATION FOR OBJECTS IN INTERACTIVE VIDEO AND INTERFACE FOR THE SYSTEM

(71) Applicant: INHA-INDUSTRY PARTNERSHIP INSTITUTE, Nam-ku, Incheon (KR)

(72) Inventor: Geun Sik Jo, Incheon (KR)

(73) Assignee: Geun Sik Jo, Incheon (KR)

( * ) Notice: Subject to any disclaimer, the term of this patent is extended or adjusted under 35 U.S.C. 154(b) by 0 days.

(21) Appl. No.: 14/570,866

(22) Filed: Dec. 15, 2014

(65) Prior Publication Data
US 2015/0229996 A1    Aug. 13, 2015

(30) Foreign Application Priority Data
Feb. 12, 2014  (KR) ........................ 10-2014-0015962

(51) Int. Cl.
| | |
|---|---|
| *H04N 5/445* | (2011.01) |
| *H04N 21/472* | (2011.01) |
| *H04N 21/61* | (2011.01) |
| *H04N 21/2343* | (2011.01) |
| *G06K 9/00* | (2006.01) |
| *H04N 21/81* | (2011.01) |
| *H04N 21/84* | (2011.01) |
| *H04N 21/4725* | (2011.01) |

(52) U.S. Cl.
CPC ... *H04N 21/47205* (2013.01); *G06K 9/00711* (2013.01); *H04N 21/234309* (2013.01); *H04N 21/6125* (2013.01); *H04N 21/8146* (2013.01); *H04N 21/84* (2013.01); *H04N 21/4725* (2013.01)

(58) Field of Classification Search
CPC .................................................. H04N 21/4725
USPC ............................................................ 725/40
See application file for complete search history.

(56) References Cited

U.S. PATENT DOCUMENTS

2002/0056136 A1\* 5/2002 Wistendahl ....... G06F 17/30017
725/135
2004/0021684 A1\* 2/2004 Millner .......... H04N 21/234318
715/719

(Continued)

FOREIGN PATENT DOCUMENTS

| KR | 10-2013-0108684 A | 10/2013 |
|---|---|---|
| KR | 10-2013-0143613 | 12/2013 |

OTHER PUBLICATIONS

Yi, Y.H., et al., "Collaborative video annotation and browsing system using linked data," Korea Intelligent Information Systems Society 2011 Conference, May 2011, pp. 455-460.

(Continued)

*Primary Examiner* — Michael Hong
(74) *Attorney, Agent, or Firm* — Madeline F. Schiesser; Keohane & D'Alessandro PLLC (57) ABSTRACT

A system and method for making a semantic annotation for a moving object in an interactive video and an interface for the system is described. The annotation creating system may include an annotation creating unit adapted to create annotation information on a moving object contained in a video, and an annotation replaying unit adapted to execute a preview of the annotation information by the video frame or shot. The video and the annotation information may be registered in a platform for sharing the video.

18 Claims, 9 Drawing Sheets

(56) References Cited

U.S. PATENT DOCUMENTS

2012/0084812 A1* 4/2012 Thompson ....... H04N 21/25891
725/34
2013/0275232 A1* 10/2013 Oh ..................... G06Q 30/0273
705/14.69
2013/0339857 A1* 12/2013 Garcia Bailo ........ G06F 3/0484
715/723

OTHER PUBLICATIONS

Office Action for Korean Patent Application No. KR 10-2014-0015962, Feb. 9, 2015, 7 Pages.

* cited by examiner

SYSTEM AND METHOD FOR MAKING SEMANTIC ANNOTATION FOR OBJECTS IN INTERACTIVE VIDEO AND INTERFACE FOR THE SYSTEM

CROSS-REFERENCE TO RELATED APPLICATIONS

This U.S. non-provisional patent application claims priority under 35 U.S.C. §119 to Korean Patent Application No. 10-2014-0015962, filed on Feb. 12, 2014, in the Korean Intellectual Property Office, the entire contents of which are hereby incorporated by reference.

BACKGROUND

Example embodiments described herein relate to a technology of making an annotation to be used in an interactive video environment.

Annotation of the conventional video system is performed as follows.

A video provider or a highly-qualified expert educated in a broadcasting company may create annotation by means of a video annotation tool dedicated for a video to be annotated. Alternatively, a layman may create the annotation in such a simple way as to dispose text on a screen. In these cases, the created annotation is mostly a static annotation displayed at a fixed position. Further, the created annotation is provided to a video-watching user in a unidirectional manner or in the form of a static text or image. In some cases, the annotation may be made to allow for interaction with the user, but it is provided in the form of a link, allowing the user access only to another video or a web site.

As an example, a method of creating situation information on a given scene using text information is disclosed in Korean Patent No. 10-1072347 issued on Oct. 5, 2011.

As described above, in a conventional environment for watching internet television programs, a created annotation is unilaterally provided as a text or image of a video, which may be provided through an internet television program, thereby making it impossible for a viewer to interact with the video and to receive or add additional information from or to the previously created annotation.

As another example, when a user watches a video on a YOUTUBE web site (i.e., Youtube.com), the user can only access other videos on the YOUTUBE web site or another web site by clicking relevant text information on the video. Further, if necessary, an authorized user can add a new annotation, which may be provided in the form of a simple text link, in a previously created annotation.

Even if there is an increasing demand for annotation on a moving object in a video and thereby for collection of various information and more active interaction with the video, the use of such a simple annotation allows the viewer only to watch the annotation, which is provided in a unilateral and static manner or in the form of a limitedly interactive link. As a result, in order to obtain new other information or perform other work, the video-watching user should frequently exit the screen, on which the video is being displayed, and perform an additional action on another screen.

SUMMARY

There is an increasing user demand for a system configured to allow video-watching users to interactively obtain additional annotation information on a static or moving object in a video and if necessary, add desired annotation information to the video. To meet such a demand, it is necessary to realize a system allowing a user to annotate a video more easily and interactively. That is, it is necessary to realize a system for making a semantic annotation, which can be easily and intuitively used by users, and a system for sharing the created semantic annotation with other users.

Example embodiments provide a system, in which an intuitive interface allowing for easy interaction with a user is provided, and a method of using the interface.

According to example embodiments, an annotation creating system may include an annotation creating unit adapted to create annotation information on a moving object contained in a video, and an annotation replaying unit adapted to execute a preview of the annotation information by the video frame or shot. The video and the annotation information may be registered in a platform for sharing the video. The unification of video with the annotation information on the Internet is achieved.

In some aspects, the annotation creating system may further include a video management unit adapted to register a video to be annotated. The video may be a video uploaded on an internet or stored in a user terminal.

In other aspects, the annotation creating system may further include a video management unit adapted to register a video to be annotated. The video management unit may be adapted to convert a format of the video to a compatible format and register the converted video. The annotation information is overlaid as the video frame displays on a video screen and the annotation information makes the video interactive.

In still other aspects, the annotation creating system may further include a tool structured to create an annotation. The tool may be adapted to include functions for selecting a video, selecting a moving object in a video, inputting an image or text to be annotated in a moving object, tracking a moving object in a video, aligning frames or shots of a video, reviewing or modifying an annotation by a moving object, and executing a preview of annotation.

In even other aspects, the annotation creating unit may be adapted to create the annotation information by means of an image input for the moving object. The image may be an image uploaded on the Internet or registered in the platform. The annotation information is managed to be separated from the video.

In yet other aspects, the annotation creating unit may be adapted to track the moving object in the video and accumulate a path data of the moving object by a frame or time.

In further aspects, the annotation creating unit may be adapted to define a function to be performed when the moving object is selected, with respect to the annotation information.

In still further aspects, the annotation replaying unit may be adapted to dispose the annotation information on a video screen. The annotation information may be overlaid based on a frame or time corresponding to a path of the object.

A video sharing system may include a video management unit adapted to register a video selected by an annotation creating tool, an annotation management unit adapted to register annotation information created on a moving object in the video by means of the annotation creating tool, and a video replaying unit adapted to apply the annotation information to the video when the video is selected and replay the video including the annotation information thus applied. A web service may be provided to exchange information with the annotation creating tool and to search and watch the video. A semantic web and social network service (SNS)

may be provided to exchange information with the annotation creating tool and to implement information push while watching the video. A semantic web may be provided to exchange information with the annotation creating tool and to implement information push while watching the video.

In some aspects, the video management unit may be adapted to convert a format of the video to one video format supported by a user terminal and register the converted video. The annotation information is overlaid as the video frame displays on a video screen and the annotation information makes the video interactive.

In other aspects, the annotation management unit may be adapted to manage an image to be annotated and provide the image to the annotation creating tool. The annotation information is managed to be separated from the video.

In still other aspects, the video replaying unit may be adapted to dispose the annotation information on a video screen, the annotation information being overlaid based on a frame or time corresponding to a path of the object.

In even other aspects, the annotation management unit may be adapted to register a function, which is defined on the annotation information by means of the annotation creating tool, as a function to be performed when the moving object is selected. The video replaying unit may be adapted to combine the function defined on the annotation information with the moving object when the video is replayed.

According to example embodiment, a method for sharing a video for a computer may include registering a video selected by an annotation creating tool, registering annotation information created on a moving object in the video by means of the annotation creating tool, and applying the annotation information to the video when the video is selected and replaying the video including the annotation information thus applied. A web service may be provided to exchange information with the annotation creating tool and search and watch the video. A semantic web and social network service (SNS) may be provided to exchange information with the annotation creating tool and to implement information push while watching the video. A semantic web may be provided to exchange information with the annotation creating tool and to implement information push while watching the video.

In some aspects, the sharing method may further include creating annotation information on a moving object in the video, before the video and the annotation information are registered, and then executing a preview of the annotation information by the video frame or shot. The video and the annotation information may be registered in a platform for sharing the video by means of the annotation creating tool. The unification of video with the annotation information on an internet is achieved.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown. Example embodiments may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1:
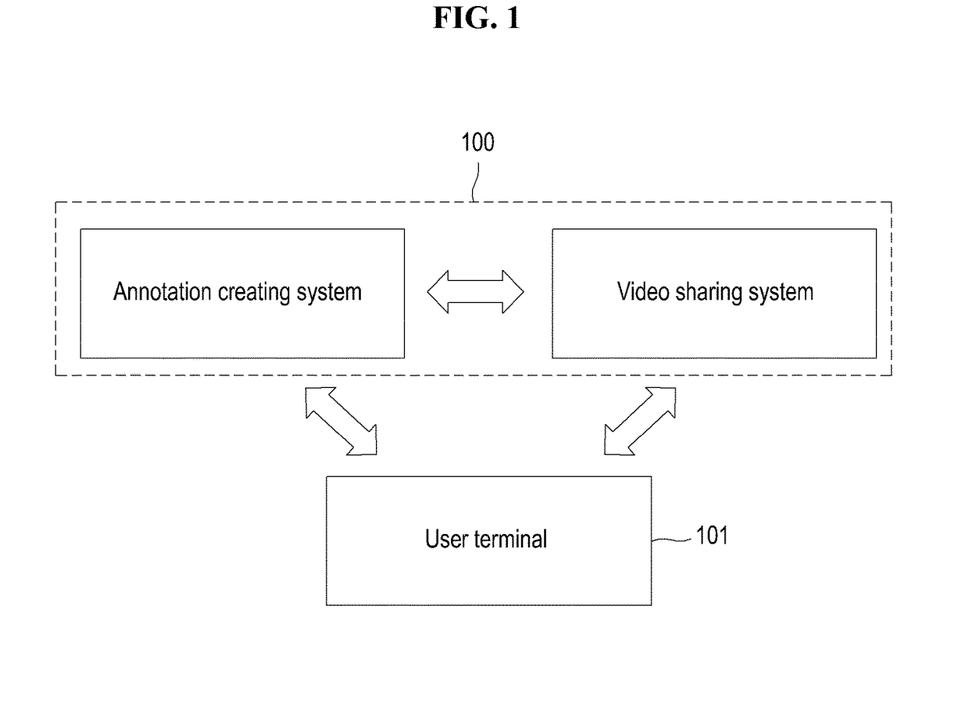
FIG. 1 is a diagram illustrating an example of a video-based annotation environment according to example embodiments.

FIG. 1 is a diagram illustrating an example of a video-based annotation environment according to example embodiments. FIG. 1 shows a video-based semantic annotation system 100 and a user terminal 101. The arrows of FIG. 1 show that data communication between the semantic annotation system 100 and the user terminal 101 can be performed via a wired or wireless network.

The user terminal 101 may mean existing terminal devices that access web/mobile sites related to the semantic annotation system 100 or are capable of installing and executing a service dedicated application. For example, the user terminal 101 may be one of a personal computer (PC), a smartphone, and a tablet PC. Here, the user terminal 101 may be the web/mobile sites or the customized applications to execute overall service operations including the following: configuring a service screen and inputting, transmitting and receiving, and storing relevant data.

The semantic annotation system 100 may be configured to serve as a platform allowing a user to make a video-based annotation and to share an annotated video with others. The unification of video with the annotation information on the Internet is achieved.

When providing information, the semantic annotation system 100 may create semantic annotation on a moving object by means of a structured tool such that the semantic annotation is expressed easily and structurally, thereby making it possible to share the created annotation along with an interactive video.

In example embodiments, the semantic annotation on a moving object may allow the user to plot user-needed meta information, which is related to the moving object, on the video along a moving path of the moving object as image or text information. This may allow the user to access any other desired video or web site or execute any other interactive functions when selecting the plotted information.

The use of the semantic annotation makes it possible to intuitively and easily provide information on stationary or moving objects, which appear in a real or virtual world on the video, to various video viewers, based on the viewer's purpose, without departure from the current video screen.

Figure 2:
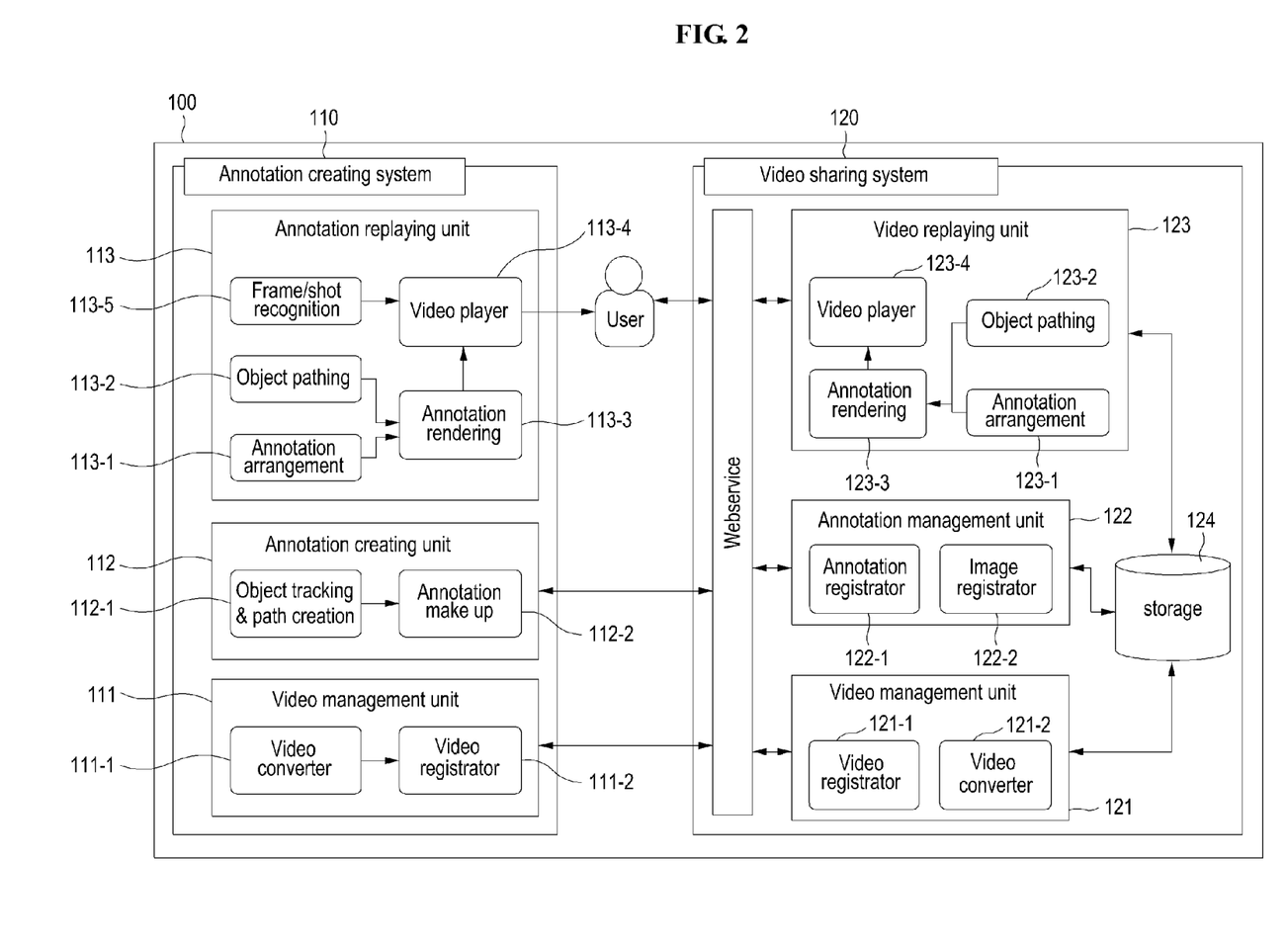
FIG. 2 is a block diagram exemplarily illustrating an internal configuration of a semantic annotation system according to example embodiments.

FIG. 2 is a block diagram exemplarily illustrating an internal configuration of a semantic annotation system according to example embodiments.

Referring to FIG. 2, the semantic annotation system 100 may include an annotation creating system 110 allowing a user to make a semantic annotation for an object moving in a video, and a video sharing system 120 allowing a user to share and watch an annotated video.

The annotation creating system 110 may include a video management unit 111, an annotation creating unit 112, and an annotation replaying unit 113, and the video sharing system 120 may include a video management unit 121, an annotation management unit 122, a video replaying unit 123, and a webservice.

In some aspects, the semantic annotation system 100 may be configured to easily create semantic annotation on a moving object in a video, to replay the video along with the annotation information, and to share the annotated video with other users.

The following description is given to provide more detailed understanding of the components of the annotation creating system 110.

The video management unit 111 may be configured to allow the user to perform a registration operation on a video, which is stored in a local storage unit or is uploaded on the Internet but is not annotated, along with meta information. Here, the video management unit 111 may convert the video to a video having any other compatible format and then perform a registration operation on the converted video. As an example, a video converter 111-1 may convert a format of the video into a compatible format by means of an open source (e.g., FFmpeg), and a video registrator 111-2 may register the video converted by the video converter 111-1 and particular meta information of the video in a storage 124 of the video sharing system 120. The annotation information is overlaid as the video frame displays on a video screen and the annotation information makes the video interactive.

The annotation creating unit 112 may create an annotation related to a static or dynamically moving object in a video (in 112-2). To track a path or trajectory of the static or dynamically moving object, the annotation creating unit 112 may include a structure 112-1 configured to automatically or manually track the object and then cumulatively store trajectory data by the frame or time. As an example, a size of the trajectory data is excessively increased when trajectory data of an object having two axes on a two-dimensional plane is obtained by the frame or time, thereby resulting in difficulty in storing or sharing the trajectory data. According to example embodiments, in order to effectively handle the trajectory data, the annotation creating unit 112 may use a variety of algorithm including the following: cubic spline interpolation, nearest neighbor interpolation, bilinear interpolation, Kriging interpolation, and trend surface analysis. Further, the annotation creating unit 112 may be configured to input image or text information, which represents the object to the user, and to define a function to be performed when selecting the object. The annotation creating unit 112 may refer the image for expressing the object to the Internet or may include a function of referring an image registered at the annotation management unit 122. The annotation creating unit 112 may be configured to register annotation information or the trajectory data of the annotated object in the video, in the storage 124 of the video sharing system 120. The annotation information is managed to be separated from the video.

The annotation replaying unit 113 may be configured to make a rendering 113-3 of the previously registered video and the previously created annotation information 113-1 along the previously-tracked object path 113-2 and thereby allow a user to replay and watch the video with the annotation information through a video player 113-4. For example, to allow the user to move and replay the video by the frame, time, or shot, the annotation replaying unit 113 may be configured to provide function 113-5 of recognizing frames or shots of the video and function of disposing the previously created annotation on a video screen, and function of relocating the annotation with a frame or time along the object path 113-2. In other words, the annotation replaying unit 113 may execute a preview of the annotation information by a unit of a frame or shot of the previously registered video.

The annotation creating system 110 may utilize a function provided through a web service to register the video information registered by the video management unit 111 and the annotation information generated by the annotation creating unit 112, in the storage 124 of the video sharing system 120. A detailed example of an interface allowing a user to perform such operations will be described with reference to FIG. 3.

The following description is given to provide more detailed understanding of the components of the video sharing system 120.

The video management unit 121 may be configured to perform a registration operation on a video, which is demanded by the video management unit 111 of the annotation creating system 110, along with meta information thereof. For example, the video management unit 121 may include a video registrator 121-1 configured to register a corresponding video in the storage 124, in response to request from the video management unit 111. The video management unit 121 may further include a video converter 121-2 configured to convert the video to one of video formats suitable for the user's viewing environment, before the registration of the video in the storage 124. As an example of such a viewing environment, in the normal desktop computer environment, the CHROME web browser supports video files in MP4 format and an INTERNET EXPLORER web browser supports video files in AVI and WMV formats. As other examples of such a viewing environment, in the IPHONE environment, the SAFARI web browser supports video files in MP4 format, and in the ANDROID environment, the CHROME web browser supports video files in MP4 format. The video management unit 121 may be configured to allow the user to replay a video adaptively in various user environments.

The annotation management unit 122 may organize the annotation information made by the annotation creating unit 112 of the annotation creating system 110 and an image representing an object in the annotation and then store the organized data in the storage 124. For this, the annotation management unit 122 may include an annotation registrator 122-1 configured to register the annotation information made by the annotation creating unit 112 in the storage 124 and organize the annotation information in advance and to define a function of selecting the annotation. Further, the annotation management unit 122 may further include an image registrator 122-2 configured to store and manage images required for the annotation and provide the image to the annotation creating system 110 in response to the request from the annotation creating system 110. The annotation information is managed to be separated from the video.

The video replaying unit 123 may be configured to make a rendering 123-3 of the video previously stored in the storage 124 for the user to watch and the annotation information 123-1 along the object path 123-2 and thereby to allow a user to replay and watch the video with the annotation information via a video player 123-4. For this, the video replaying unit 123 may dispose the annotation, which the annotation creating unit 112 of the annotation creating system 110 creates, on a video screen and relocate the trajectory with a frame or time. The video replaying unit 123 may also combine an object with a function when the annotation is selected and provide the combined result along with the video.

The video sharing system 120 may be configured to provide a web service for exchanging information with the annotation creating system 110 and allow a user to easily search and watch a video. A detailed example of an interface allowing a user to perform such operations will be described with reference to FIG. 4.

Figure 3:
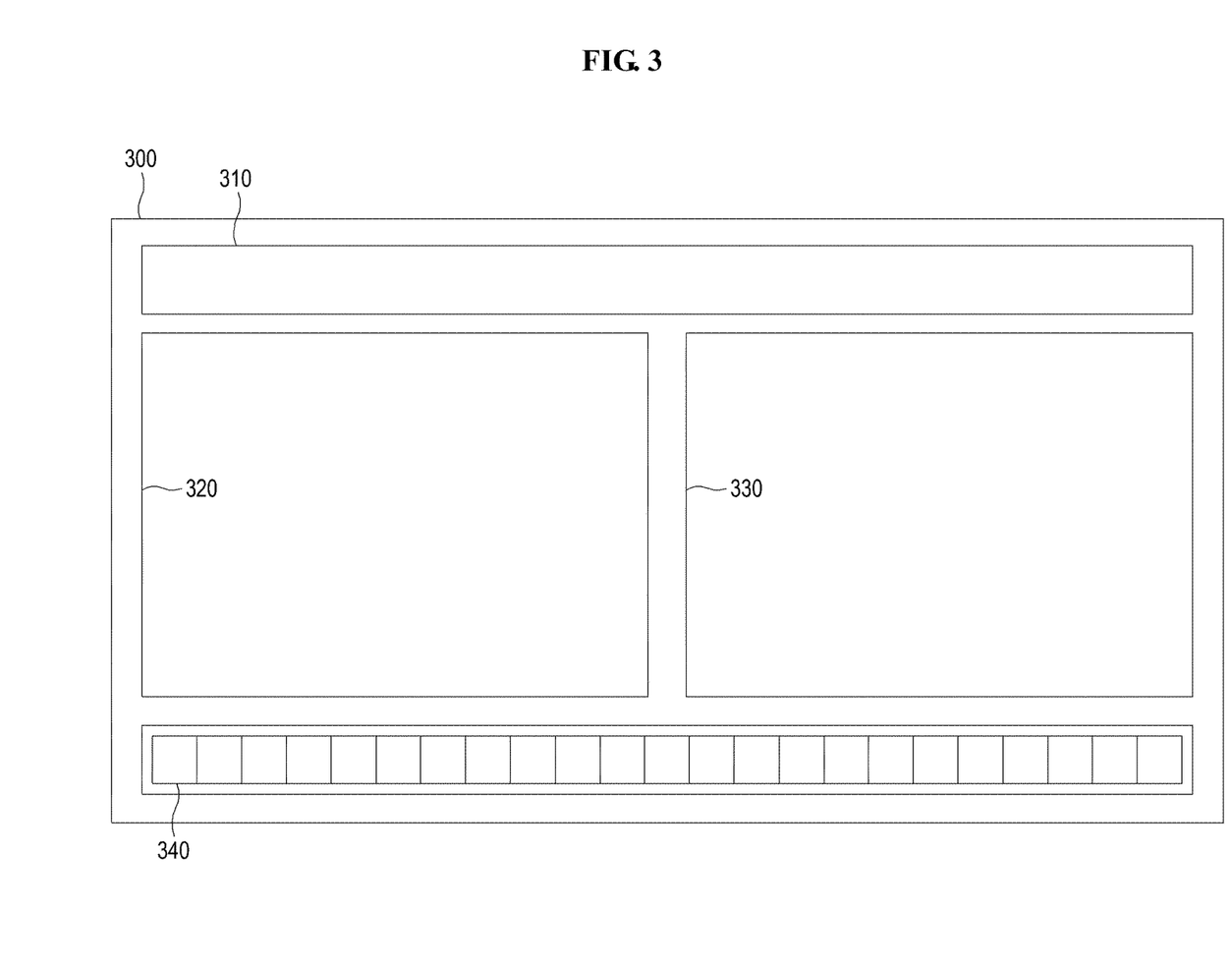
FIGS. 3, 5, and 6 are diagrams exemplarily illustrating a user interface of an annotation creating system according to example embodiments.

FIG. 3 is a diagram exemplarily illustrating a user interface of an annotation creating system according to example embodiments.

Referring to FIG. 3, a user interface 300 of the annotation creating system may include a menu toolbar 310, a video-playing screen 320, an annotation information list 330, and a frame/shot preview 340.

The menu toolbar 310 may be provided to allow a user to open a video, save a video, replay a video, temporarily pause a video, stop a video, rewind a video, fast forward a video, change a video replaying speed, change a video selection mode, create a new object, change an annotation mode, change an object tracking mode, align shots of a video, refer information (e.g., time or frame number) on a currently played video, preview a video, set a range for creating an object annotation, set or change an initial annotation state (e.g., horizontal and vertical positions and sizes), set or change an annotation display position relative to an object tracking position.

The video-playing screen 320 may be configured to allow the user to replay a video in a selected video replaying speed or replay annotation information along with a video at annotation preview.

The annotation information list 330 may be configured to provide the annotation information on an object in the form of a list. For example, the annotation information list 330 may be configured to allow a user to check or change the annotation information associated with an object that the user is creating. A detailed example thereof will be described with reference to FIG. 5.

The frame/shot preview 340 may be configured to display scenes of the video on a frame-by-frame or shot-by-shot basis, using a frame or shot alignment function. Further, when the user selects a specific one of frames or shots of the video, the frame/shot preview 340 may be configured to allow the user to go to the position of the selected frame or shot. A detailed example thereof will be described with reference to FIG. 6.

Figure 4:
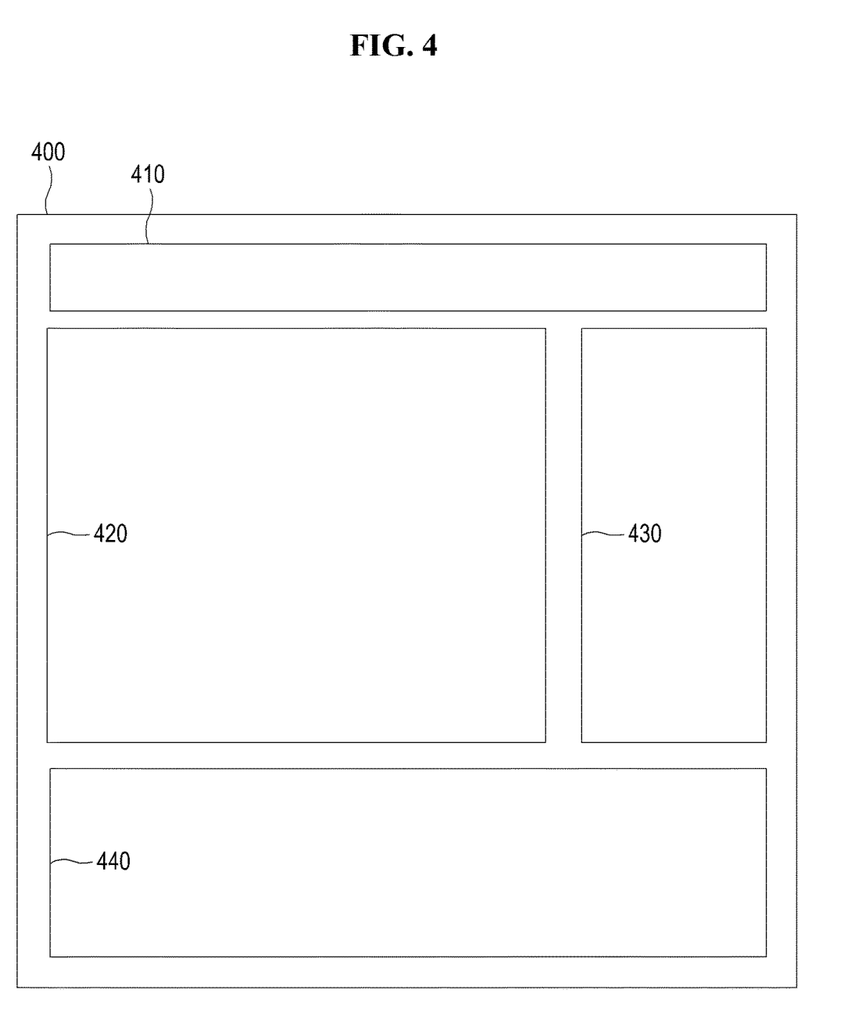
FIG. 4 is a diagram exemplarily illustrating a user interface of a video sharing system according to example embodiments.

FIG. 4 is a diagram exemplarily illustrating a user interface of a video sharing system according to example embodiments.

Referring to FIG. 4, a user interface 400 of the video sharing system may include a menu toolbar 410, a video-playing screen 420, a video category list 430, and a relevant video list 440.

The menu toolbar 410 may include the following: user registration, user log-in, video list, user's own video list, and user's own image list.

The video-playing screen 420 may be configured to allow the user to apply annotation information to a video and watch the video.

The video category list 430 may provide a category list for classifying videos to the user.

The relevant video list 440 may provide a video list of a category which the user selects from the video category list 430 or a video list associated with a video which the user currently watches.

Figure 5:
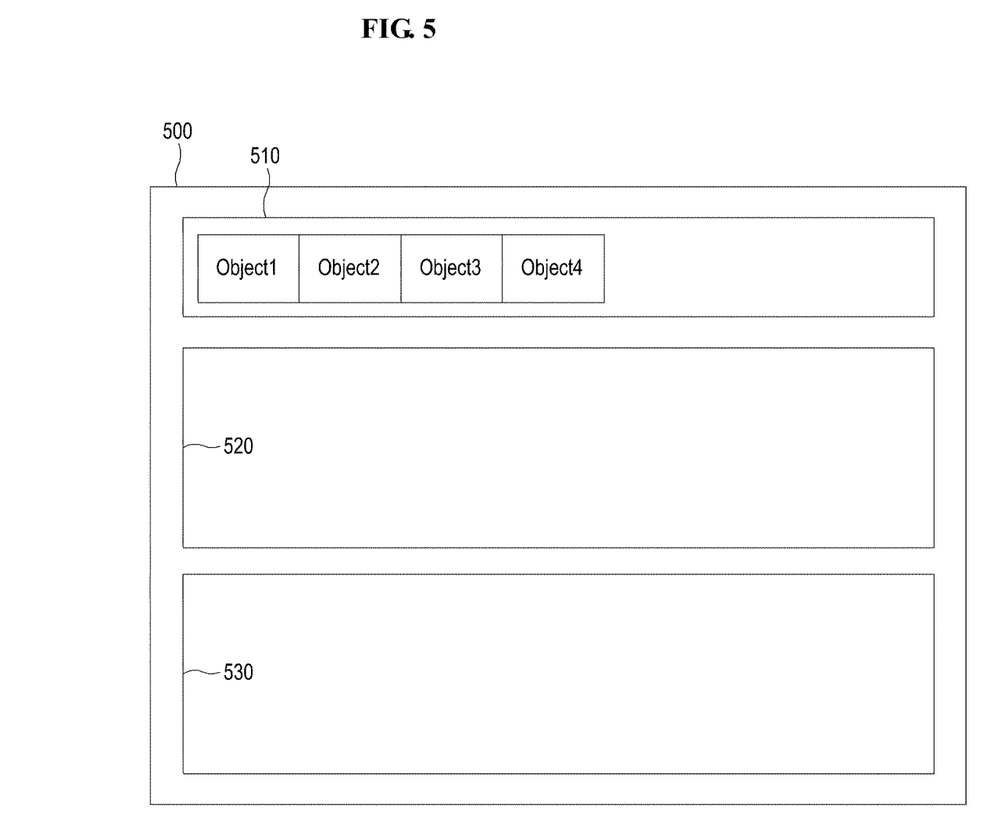

FIG. 5 is a diagram illustrating an example of the annotation information list of FIG. 3.

Referring to FIG. 5, an interface 500 for the annotation information list may include an annotation object list 510, current annotation information 520, and a current annotation object path list 530.

The annotation object list 510 may be configured to allow a user to refer a list of annotation information created for a working video and select annotation to be processed.

The current annotation information 520 may show items including the following: image selected for annotation being processed, address of a connected web site, and function to be performed when the annotation is selected. The items can be made up by the user.

The current annotation object path list 530 may show information such as x and y coordinates (e.g., annotation positions in a two-dimensional Cartesian coordinate system) of annotation being currently processed by the user and x- and y-direction lengths of the annotation (e.g., annotation size) with a current frame/time. The information can be made up by the user.

Figure 6:
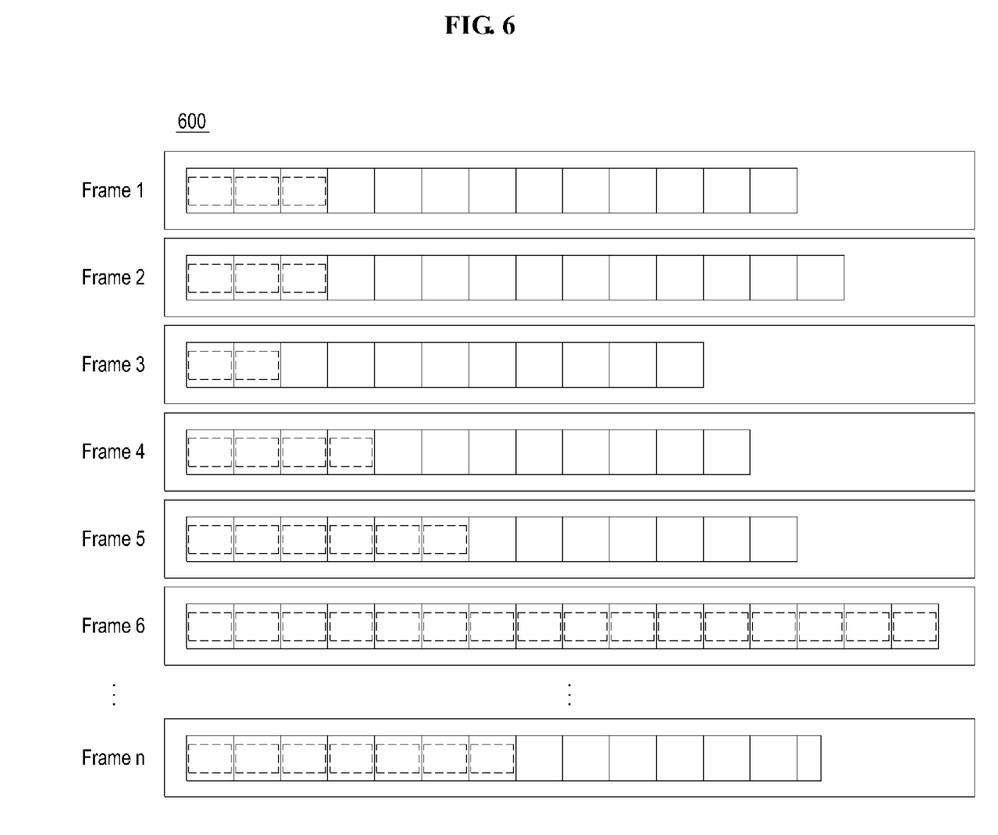

FIG. 6 is a diagram illustrating examples of a frame/shot preview described with reference to FIG. 3.

Frames/shots may be recognized by dividing a video by the frame by means of algorithm (e.g., color histogram or Euclidean distance), as shown in a frame/shot preview 600, when a shot alignment function of the menu toolbar of FIG. 3 is selected by a user and providing divided frames to the user. The frame/shot preview 600 may enable the user to select the divided frames/shots for a shift into a desired position on the video.

Figure 7:
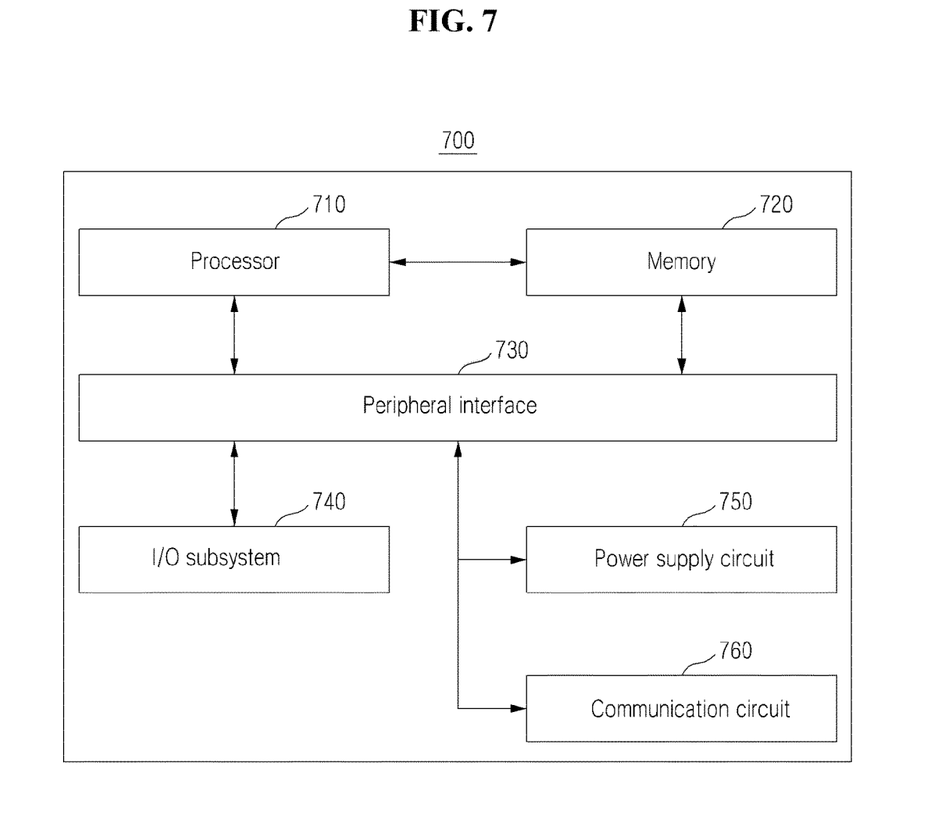
FIG. 7 is a block diagram illustrating an internal configuration of a user terminal device according to example embodiments.

FIG. 7 is a block diagram illustrating an internal configuration of a user terminal device according to example embodiments.

A user terminal device 700 may include at least one processor 710, a memory 720, a peripheral interface 730, an input/output (I/O) subsystem 740, a power supply circuit 750, and a communication circuit 760.

The configuration shown in FIG. 7 may be an example of a computer system serving as the user terminal device 700, but example embodiments may not be limited thereto. For example, the user terminal device 700 may be configured to have an additional component that is not illustrated in FIG. 7. Further, the user terminal device 700 may be configured in such a way that at least two components are connected to each other. For example, a computer system serving as the user terminal device 700 may further include a touch screen or a sensor, in addition to the components shown in FIG. 7, and moreover, the communication circuit 760 may be configured to further include a circuit for RF communication. In certain embodiments, the components of the user terminal device 700 may be implemented by hardware, software, or a combination thereof. The hardware may include one or more integrated circuits specialized for signal processing or application.

The memory 720 may include, for example, a high-speed random access memory, a magnetic disk, a static random access memory (SRAM), a dynamic random access memory (DRAM), a read-only memory (ROM), a flash memory, or a nonvolatile memory device. The memory 720 may include a software module, an instruction set, or any other data, which may be required to operate the user terminal device 700. Components such as the processor 710 or the peripheral interface 730 may access the memory 720 under the control of the processor 710.

The peripheral interface 730 may connect a peripheral I/O device of the user terminal device 700 to the processor 710 and the memory 720. The processor 710 may execute the software module or the instruction set stored in the memory 720 to perform several functions of the computer system 700 and process data.

The I/O subsystem 740 may be configured to couple various input/output peripheral devices to the peripheral interface 730. For example, the I/O subsystem 740 may include a controller for connecting a monitor, a keyboard, a mouse, a printer, or, if necessary, any other peripheral device (e.g., a touch screen or a sensor) to the peripheral interface 730. In other aspects, the input/output peripheral devices may be directly coupled to the peripheral interface 730, without using the I/O subsystem 740.

The power supply circuit 750 may supply an electric power to all or some of the components of the user terminal device 700. For example, the power supply circuit 750 may include a power management system, at least one electric power supply (e.g., a battery or an AC power), a recharging system, a power failure detection circuit, a power converter or inverter, a power status indicator, or any other component for generating, managing, or distributing an electric power.

The communication circuit 760 may be connected to or include at least one external port for communication between the user terminal device 700 and any other computer system. Alternatively, in certain embodiments, the communication circuit 760 may be configured to include an RF circuit for transmitting or receiving electromagnetic signals (e.g., RF signals), and the use of the RF circuit of the communication circuit 760 makes it possible for the user terminal device 700 to communicate with other computer systems.

Figure 8:
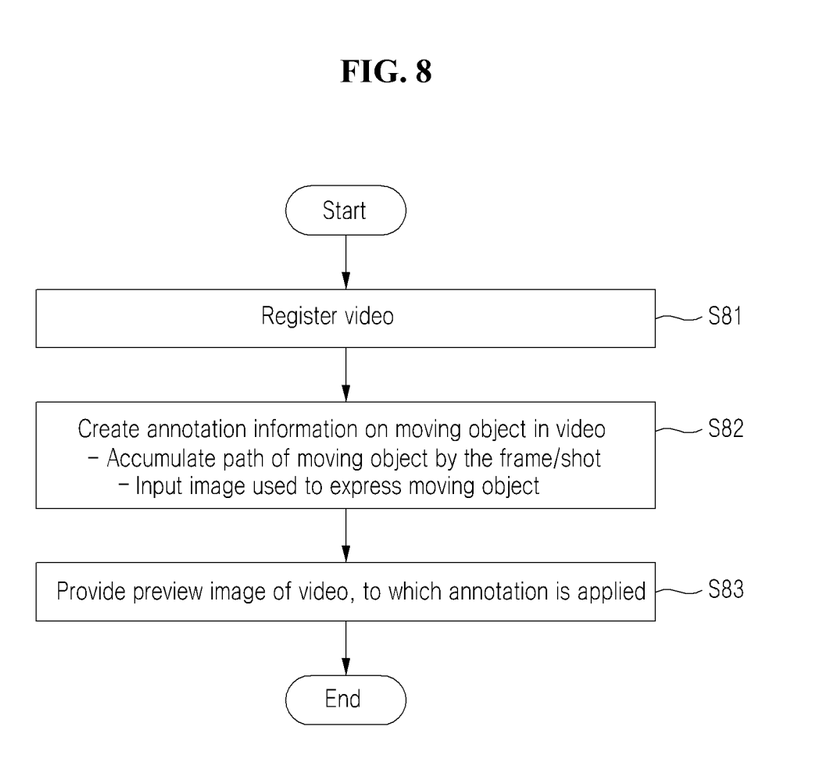
FIG. 8 is a flow chart illustrating a method of creating video-based annotation information, according to example embodiments.

FIG. 8 is a flow chart illustrating a method of creating a video-based annotation, according to example embodiments. An annotation method according to example embodiments may include steps, each of which is performed using the annotation creating system described with reference to FIGS. 1 through 6.

In step S81, the annotation creating system may perform a registration operation on a target video, in which an annotation will be created. For example, in the annotation creating system, a user may select one of a plurality of videos, which are stored in a user terminal device or are loaded on the Internet, as the target video. Here, the annotation creating system may perform a registration operation on the target video and meta information thereof. In certain embodiments, the annotation creating system may convert a format of the target video into a compatible video format and then perform a registration operation on the converted video.

In step S82, the annotation creating system may create annotation information on a moving object appearing on the video, using information given by the user. The annotation creating system may track and accumulate a trajectory of a target object on the video, which is selected by the user. As an example, the annotation creating system may track, accumulate, and store a moving path of the target object by searching a video registered in step S81 by a unit of a frame/shot on which the target object appears. In example embodiments, in the annotation creating system, image or text information suitable for representing the target object may be selected depending on the user's choice. Further, the annotation creating system may be used to assign a function (e.g., for creating a link to a shopping site, creating connection for an ordering call, and so forth), which will be executed when the target object is selected. Here, the image for representing the object may be selected from images uploaded on the Internet or previously registered in the video sharing system.

In step S83, the annotation creating system may provide a preview image(s) of the annotation being currently processed along with the video. In other words, to allow the user to watch a video and check the annotation made by the user, the annotation creating system may be configured to replay the video to which the annotation made in the step S82 is applied. The annotation creating system may recognize each frame or shot of the video, thereby making it possible to replay the video with a target position shifted by the frame/time/shot. Further, the annotation creating system may dispose the annotation made in the step S82 on the video screen. Here, the annotation may be overlaid based on a frame/time corresponding to a moving path of the target object. The annotation creating system may register the video information registered in the step S81 and the annotation information (e.g., on an image or text for representing the object, a trajectory of the object, and so forth) made in the step S83 in the storage of the video sharing system.

Figure 9:
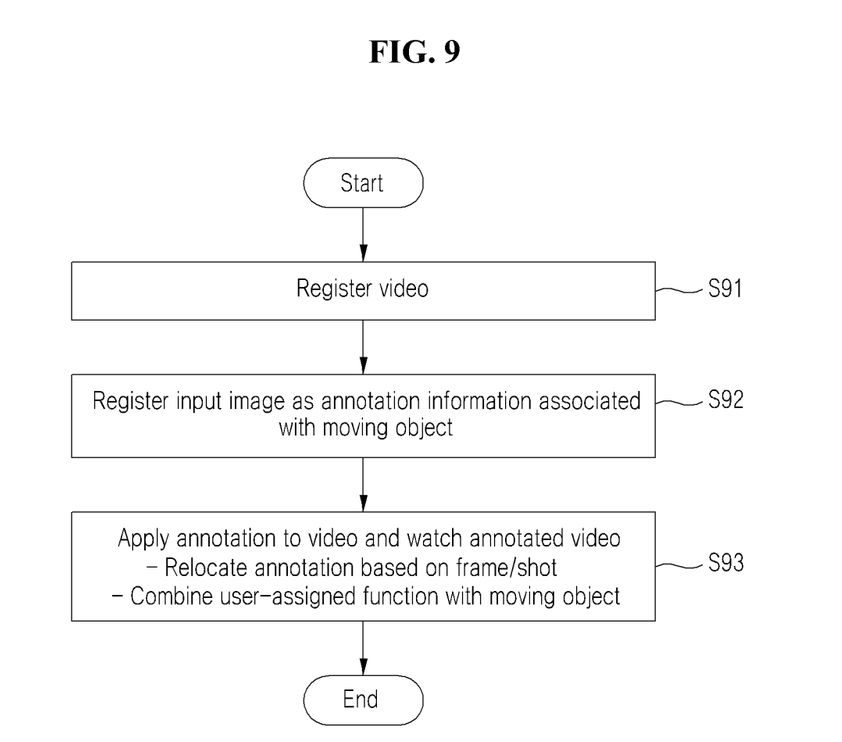
FIG. 9 is a flow chart illustrating a method of sharing video-based annotation information, according to example embodiments.

FIG. 9 is a flow chart illustrating a method of sharing video-based annotation information, according to example embodiments. A video-sharing method according to example embodiments may include steps, each of which is performed using the video sharing system described with reference to FIGS. 1 through 6.

In step S91, the video sharing system may perform a registration operation on a to-be-shared video and meta information thereof, in response to a request from a user. Here, the to-be-shared video may be a video annotated by the user in the annotation creating system, and the video sharing system may receive the video from the annotation creating system and convert a format of the video to one of video formats (e.g., MP4, AVI, WMV, and so forth) suitable for the user's viewing environment.

In step S92, the video sharing system may perform a registration operation on the annotation information made by the annotation creating system in connection with the video registered in the step S91. As an example, the video sharing system may organize an input image or text as the annotation information associated with a moving object, and store the organized result in a storage device. The video sharing system may register information (e.g., image or text) annotated on the moving object of the video along with a trajectory of the moving object. Further, the video sharing system may perform a registration operation on functions (e.g., for creating a link to a shopping site, creating connection for an ordering call, and so forth), which may be assigned to the annotation information of the moving object.

In step S93, the video sharing system may apply user-created annotation to a to-be-shared video and replay the video thus annotated. The video sharing system may be configured to dispose the annotation registered in the step S92 on a video screen to be shared. In this case, the annotation can be overlaid based on a frame/time corresponding to the trajectory of the moving object. Further, the video sharing system may be configured to combine the user-assigned function for the annotation information with the moving object, thereby allowing the user to perform the user-assigned function, when the object on the watching video is selected by the user.

The afore-described annotation-making and video-sharing methods may be performed based on the description of FIGS. 1 through 7, but example embodiments may not be limited thereto. As an example, the number of steps in each of the annotation-making and video-sharing methods may be decreased or increased. As another example, at least two of steps in each of the annotation-making and video-sharing methods may be performed in a single step through combination thereof and may be performed in different order or sequence.

The methods according to example embodiments of the inventive concept may be realized in the form of a program or instruction, which can be executed in various computer systems and can be stored in a computer-readable media.

In the present embodiment, such program may be provided in the form of a PC-based program or an application for a mobile terminal device. As an example, the annotation-making method described with reference to FIG. 8 may be performed in response to control signals, which may be generated by an application installed in a user terminal device. In this case, the user terminal device may receive a file, which is required for installing an annotation-making application, from a file distribution system. For this, the file distribution system may include a file management unit for storing and managing the file and a file sending unit for sending the file to the terminal device. The file sent from the file distribution system may be installed in the user terminal device and may serve as an application for controlling the steps of the annotation-making method to be performed in the user terminal device.

In example embodiments, the application for creating annotation information may be realized in the form of an independently operatable program. In other embodiments, the application for creating annotation information may be provided in the form of an in-app and may be operated in a specific application containing the same.

As described above, according to example embodiments, a service for creating a semantic annotation on a moving object in an interactive video is provided, and thus, a user can create semantic annotation information on a moving object in an interactive video. According to example embodiments, a service for allowing a user to share video-based annotation information and watch the video is provided. Accordingly, a user can replay and watch not only a previously-registered video but also previously-made semantic annotation information on the moving object and can share them with other users.

The devices or units described herein may be implemented using hardware components, software components, or a combination thereof. For example, devices and components described therein may be implemented using one or more general purpose or special purpose computers, such as, but not limited to, a processor, a controller, an arithmetic logic unit, a digital signal processor, a microcomputer, a field programmable gate array (FPGA), a programmable logic unit, a microprocessor or any other device capable of responding to and executing instructions in a defined manner. A processing device may be configured to execute an operating system (OS) and one or more software applications that can be executed on the OS. The processing device also may access, store, manipulate, process, and create data in response to execution of the software. For the sake of easy understanding, the inventive concept has been described based on the example in which one processing device is used; however, one skilled in the art will appreciate that a processing device may be configured to include a plurality of processing elements and several types of processing elements. For example, a processing device may include a plurality of processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The method according to example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of example embodiments, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of example embodiments.

According to example embodiments, a service for creating a semantic annotation on a moving object in an interactive video is provided, and thus, a user can create semantic annotation information on a moving object in an interactive video.

According to example embodiments, provided is a service for allowing a user to share video-based annotation information and watch the video. Accordingly, a user can replay and watch not only a previously registered video but also previously created semantic annotation information on the moving object and can share them with other users.

While example embodiments of the inventive concepts have been particularly shown and described, it will be understood by one of ordinary skill in the art that variations in form and detail may be made therein without departing from the spirit and scope of the attached claims.

What is claimed is:

1. A video augmented object creating system, comprising:
an augmented object creating unit adapted to;
track a path of movement of an object displayed in a video across a first frame and a second frame of the video, wherein the path of movement of the object is tracked from a first position in the first frame to a second position in the second frame, and wherein the second position is distinct from the first position;
receive an interaction of a user with the object displayed in the video, the interaction comprising the user selecting the object in the video, and the interaction generating an augmented object instruction from the user, the augmented object instruction comprising a designation of the object displayed in the video by the user and a request for an augmented object associated with the object;
identify the selected object by machine object recognition and, in response to the selection of the object in the video, dynamically retrieve information about the object from a semantic web;
create augmented object information for the selected object based on the augmented object instruction and the retrieved information from the semantic web;
generate the augmented object from the augmented object information and display the retrieved information from the semantic web with the generated augmented object; and
associate the generated augmented object with the tracked path of movement of the object, wherein the augmented object tracks with the object displayed in the video; and
an augmented object replaying unit adapted to:
execute a preview of the augmented object information for the video by relocating the augmented object information for the object along the path of movement of the object from the first position in the first frame to the second position in the second frame; and
receive an editing instruction from the user in response to the executed preview, the editing instruction comprising a change in the augmented object information for the video,
wherein the video and the augmented object information are registered in a platform for sharing the video, wherein the user shares the video through the platform, and
wherein the augmented object information for the video is adapted to permit user interaction with the augmented object in an environment of the video, the interaction with the augmented object triggering further interaction with the augmented object in the environment of the video.

2. The video augmented object creating system of claim 1, further comprising a video management unit adapted to register the video, and
wherein the video is uploaded to an internet or stored in a user terminal.

3. The video augmented object creating system of claim 1, further comprising a video management unit adapted to register the video, and
wherein the video management unit is adapted to convert a format of the video to a compatible format and register the converted video.

4. The video augmented object creating system of claim 1, further comprising a tool structured to create the augmented object information, and
wherein the tool is adapted to include functions for selecting the video for augmented object, selecting the object in the video, inputting the augmented object information for the object including an image or text to be annotated to the object, aligning frames or shots of the video, reviewing or modifying the augmented object, and executing the preview of the augmented object.

5. The video augmented object creating system of claim 1, wherein the augmented object creating unit is adapted to create the augmented object information by means of an image input for the object, and wherein the image is an image uploaded to an internet or registered in the platform.

6. The video augmented object creating system of claim 1, wherein the augmented object creating unit is adapted to define a function to be performed when the object is selected, with respect to the augmented object information.

7. The video augmented object creating system of claim 1, wherein the augmented object information is overlaid on the video based on a frame or time corresponding to the path of the object.

8. The video augmented object creating system of claim 1, wherein unification of video with the augmented object information on an internet is achieved.

9. The video augmented object creating system of claim 1, wherein the augmented object information is overlaid as the video frame displays on a video screen and the augmented object information makes the video interactive.

10. The video augmented object creating system of claim 1, wherein the augmented object information is managed to be separated from the video.

11. A knowledge sharing system, comprising:
a video management unit adapted to register a video selected by an augmented object creating tool, the video including an object that moves along a path of movement from a first position in a first frame of the video to a second position in a second frame of the video, wherein the second position is distinct from the first position;
an augmented object management unit adapted to:
generate, in response to a selection by a user of the object, an augmented object instruction, the augmented object instruction comprising a designation of the object and a request for an augmented object associated with the object;
identify the selected object by machine object recognition and dynamically retrieve information about the object from a semantic web;
create augmented object information for the selected object based on the augmented object instruction and the retrieved information from the semantic web, the retrieved information from the semantic web to be displayed with the augmented object;
associate the augmented object with the path of movement of the object from the first position in the first frame of the video to the second position in the second frame of the video, wherein the augmented object tracks with the object displayed in the video; and
register the augmented object information created for the object displayed in the video by the augmented object creating tool; and
a video replaying unit adapted to:
apply the augmented object information to the video when the video is selected and replay the video including the information retrieved from the semantic web, the replayed video displaying the retrieved information for the object being relocated along the path of movement of the object from the first position in the first frame to the second position in the second frame,
wherein a web service is provided to exchange information with the augmented object creating tool and to search and watch the video,
wherein the user shares the video through the web service, and
wherein the augmented object information for the video is adapted to permit user interaction with the augmented object in an environment of the video, the interaction with the augmented object triggering further interaction with the augmented object in the environment of the video.

12. The knowledge sharing system of claim 11, wherein the video management unit is adapted to convert a format of the video to a video format supported by a user terminal and register the converted video.

13. The video with knowledge sharing system of claim 11, wherein the augmented object management unit is adapted to manage an image to be annotated and provide the image to the augmented object creating tool.

14. The video with knowledge sharing system of claim 11, wherein the augmented object management unit is adapted to register a function, which is defined on the augmented object information by the augmented object creating tool, as a function to be performed when the object is selected, and
wherein the video replaying unit is adapted to overlay the function defined on the augmented object information with the object when the video is replayed.

15. The knowledge sharing system of claim 11, wherein a semantic web and social network service (SNS) are provided to exchange information with the augmented object creating tool and to implement information push while watching the video.

16. A method for sharing a video with knowledge for a computer, comprising:
registering a video selected by an augmented object creating tool, the video including an object that moves along a path of movement from a first position in a first frame of the video to a second position in a second frame of the video, wherein the second position is distinct from the first position;
generating, in response to a selection by a user of the object, an augmented object instruction, the augmented object instruction comprising a designation of the object and a request for an augmented object associated with the object;
identifying the selected object by machine object recognition and dynamically retrieving information about the object from a semantic web;
creating augmented object information for the selected object based on the augmented object instruction and the retrieved information from the semantic web, the retrieved information from the semantic web to be displayed with the augmented object;
associating the augmented object with the path of movement of the object from the first position in the first frame of the video to the second position in the second frame of the video, wherein the augmented object tracks with the object displayed in the video;
registering the augmented object information created by the augmented object tool for the object that is displayed in the video;
applying the augmented object information to the video when the video is selected; and
replaying the video including the information retrieved from the semantic web, the replayed video displaying the retrieved information for the object being relocated along the path of movement of the object from the first position in the first frame to the second position in the second frame,
wherein a web service is provided to exchange information with the augmented object creating tool and to search and watch the video,
wherein the user shares the video through the web service, and wherein the augmented object information for the video is adapted to permit user interaction with the augmented object in an environment of the video, the interaction with the augmented object triggering further interaction with the augmented object in the environment of the video.

17. The method of claim 16, further comprising, before the video and the augmented object information are registered, creating the augmented object information for the object in the video; and executing a preview of the augmented object information for the video, the preview including the augmented object information for the object being relocated along the path of movement of the object from the first position in the first frame to the second position in the second frame.

18. The method of claim 16, wherein a semantic web is provided to exchange information with the augmented object creating tool and to implement information push while watching the video.

\* \* \* \* \*